United States Patent [19]

Bonnet et al.

[11] Patent Number: 4,977,518

[45] Date of Patent: Dec. 11, 1990

[54] VIDEO GRAPHICS SYSTEM EQUIPPED WITH A GRAPHICS CURSOR

[75] Inventors: Thierry Bonnet, Champigny; Yves Mathieu, Boulogne, both of France

[73] Assignee: U.S. Philips Corporation, New York, N.Y.

[21] Appl. No.: 318,085

[22] Filed: Mar. 2, 1989

[30] Foreign Application Priority Data

Mar. 8, 1988 [FR] France .................. 88 02941

[51] Int. Cl.⁵ .............................. G06F 15/40
[52] U.S. Cl. .................... 364/521; 364/518; 364/522; 340/706; 340/709
[58] Field of Search .............. 364/518, 519, 521, 522, 364/523; 340/706, 747, 750, 709, 718, 720; 382/46

[56] References Cited

U.S. PATENT DOCUMENTS

| | | | |
|---|---|---|---|
| 4,677,427 | 6/1987 | Komatsu et al. | 340/703 |
| 4,775,946 | 10/1988 | Anjyo | 340/729 X |
| 4,782,463 | 11/1988 | Sanders et al. | 364/521 |
| 4,825,359 | 4/1989 | Ohkami et al. | 364/200 |
| 4,829,455 | 5/1989 | Long et al. | 364/521 |
| 4,920,514 | 4/1990 | Aoki | 364/521 |
| 4,930,092 | 5/1990 | Reilly | 364/522 |

Primary Examiner—Dale M. Shaw
Assistant Examiner—Phu K. Nguyen
Attorney, Agent, or Firm—Michael E. Marion

[57] ABSTRACT

Video graphics system which, by means of a graphics cursor, permits the identification of encoded surfaces of images represented on a screen. In order to do this, there are added to the parameters of the encoded surface, for each surface, an identifier which can be read by slices in the course of readings effected on a plurality of successive frames. An identification memory permits the accumulation of all the slices until the complete acquisition of the identifier. This situation is brought to the attention of the user.

4 Claims, 3 Drawing Sheets

VIDEO GRAPHICS SYSTEM EQUIPPED WITH A GRAPHICS CURSOR

BACKGROUND OF THE INVENTION

The invention relates to a video graphics system equipped with a graphics cursor and with a comparator which compares the positional co-ordinates $X_C$, $Y_C$ of the graphics cursor with the co-ordinates $X_D$, $Y_D$ of each element of each line, the elements being explored in accordance with a scanning by frames, the graphics cursor interacting with the image delivered by the video graphics system.

A video graphics system of this type is known from the document EP 0 229 986 (US 4 706 074). It describes a graphics system which stores image data and which is equipped with a cursor, by means of which it is possible to insert data into the image. In order to do this, the cursor selects a zone of the image in which this transformation is to be effected and the system determines this zone on the basis of the coordinates supplied by the cursor.

The object of this document is therefore to combine the information emanating from the cursor route and from the image data route.

Thus, this device does not permit the referencing within an image, of characteristic features which are specific to it, each image zone moreover having no identification code.

SUMMARY OF THE INVENTION

The technical problem posed is that of being able to identify image portions by means of a graphics cursor, the reference of which is positioned on a desired zone.

The solution to this problem is that the video graphics system comprises:
  an image memory which, in the course of successive loadings, temporarily stores:
  (a) numerical parameters regularly explored describing encoded surfaces relating to two-dimensional images,
  (b) and an N bit identifier, specific to each encoded surface in such a manner that the N bits are successively loaded into image memory, by slices of N/P bits in the course of P successive loadings where P is greater than 1, each loading being followed by a reading of the image memory in order to display the image visually in accordance with the successive frames of the scanning by frames,
  and a graphics controller with receives the slices of N/P bits at each read frame and reconstructs the N bit identifier of an encoded surface after P successive frames, the controller comprising an identification circuit equipped with a comparator and with an identification memory which stores the identifier while accumulating the slices of N/P bits in the cyclic sequence of the reading when the comparator has detected the identity of the coordinates ($X_C$, $Y_C$) and of the co-ordinates ($X_D$, $Y_D$), the complete identifier stored being used by the video graphics controller to identify the encoded surface to which this identifier relates.

The graphics system according to the invention uses a buffer image memory which is alternatively loaded in a given cyclic sequence and then read in a different cyclic sequence. It operates on images formed of encoded surfaces which may remain identical among themselves in the course of a plurality of successive operations of loading and then of reading into memory before being renewed in their turn.

Preferably, the images constituted from encoded surfaces are synthesizing images. Such images are, for example, those described in the document EP 0 215 510 (U.S. Pat. No. 4,812,988), the contents of which is incorporated in the present disclosure as a reference and in which the encoded surfaces are formed from polygons. The latter are processed by the algorithm of the depth memory (Z-buffer) in order to display visually in two dimensions encoded images in which only the portions of polygons which are closest to an observation point appear.

On such a two-dimensional image it is desirable to be able to reference the portions of the encoded surfaces visually displayed and to locate them in the image memory which stores all the data specific to the encoded surfaces.

In order to do this, according to the invention, there is added to the coding describing the topology of each polygon an identifier which is likewise stored in image memory. This identifier is an N bit code which is delivered by slices with the parameters describing the encoded surface on each loading into image memory:
  1 identifier bit during P=N frames;
  or alternatively N/P identifier bits during P frames.

The controller may thus receive the entire identifier at the conclusion of P read frames. This limits the size of the image memory part which stores the identifier part. The polygon may thus be identified and utilized either for the visual display thereof or for any other processing, for example the display of an index.

The localization of the encoded surface is effected by displacing a graphics reference on the surface of the screen of a visual display device with the aid of a box provided with a lever activated by the user in accordance with the customary techniques known to a person skilled in the art.

Thus the graphics controller has available the co-ordinates $X_C$, $Y_C$ of the position of the graphics reference. It also has available, by means of a counter/incrementor, the position $X_D$, $Y_D$ of a current point moving on each image element of each scanning line, for which the corresponding data to be displayed are in the image memory. When these co-ordinates are identical, the position of the reference is determined and the identifier can then be stored in the identification memory after the prescribed number of frames, and then processed by the controller as described previously. The reference must remain within the same encoded surface in the course of the prescribed number of frames, in order effect the identification.

The graphic cursor will permit:
  to identification of the positions of the reference on the screen and determine the coded area in which it is positioned,
  generation of the reference by itself,
  movement of the reference on the screen by the user.

BRIEF DESCRIPTION OF THE DRAWINGS

The invention will be better understood with reference to the figures which follow and which are given by way of non-limiting examples, in which.

DETAILED DESCRIPTION OF THE INVENTION

Figure 1A:
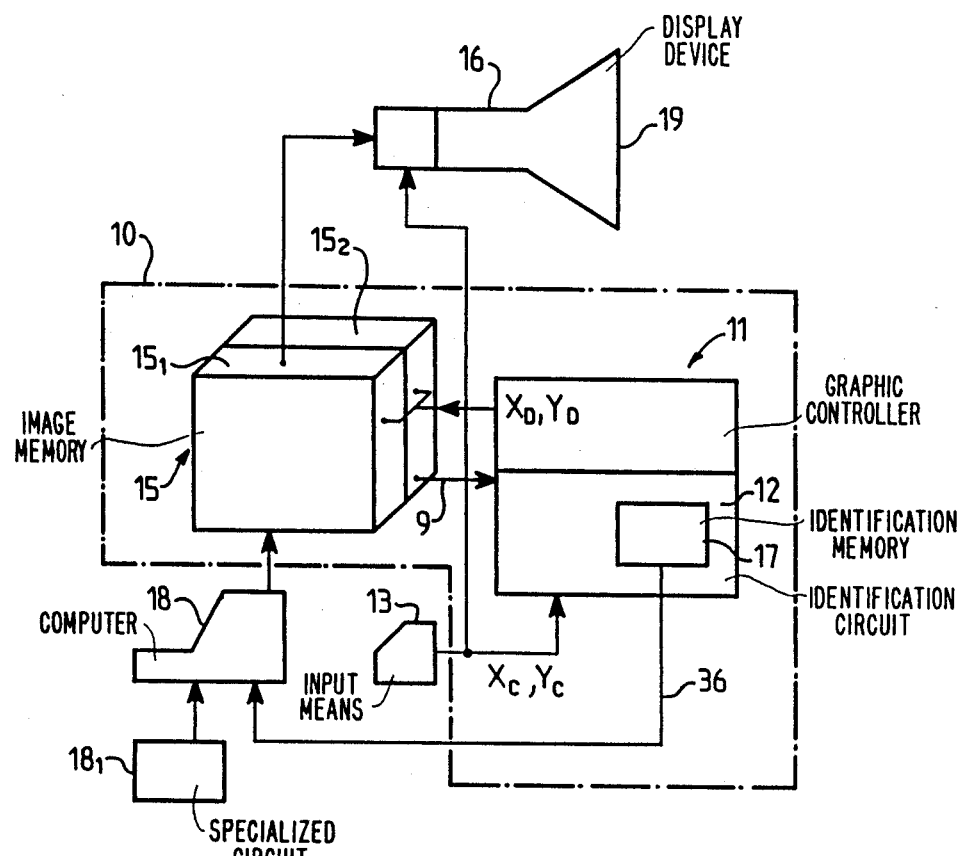
FIG. 1A represents a system for the visual display of images, comprising a video graphics system according to the invention.

FIG. 1A represents a video graphics system 10 which comprises a graphics controller 11 equipped with an identification circuit 12. The latter receives the co-ordinates ($X_C$, $Y_C$) specific to the reference of the graphics cursor by means of a box 13 activated by the user. These co-ordinates ($X_C$, $Y_C$) are employed to display a reference 14 on the screen 19 of a visual display device 16. The graphics controller 11 determines the co-ordinates ($X_D$, $Y_D$) of a current point of the screen 19, to which data in the image memory 15 correspond. The visual display device 16 operates in the video mode, in accordance with scanning lines and frames. The computer 18 transmits to the image memory 15 both the data to be displayed on the screen (field $15_1$ of the memory) and the N/P bit identifier slice (field $15_2$ of the memory). At each frames, the identifier part is replaced by a following slice. The data to be displayed of the screen are determined in accordance with the algorithm executed for the determination of the image either by the computer 18 itself or by a specialized circuit $18_1$ which is itself controlled by the computer 18. This circuits is for example, that described in the document EP 0 215 510 (U.S. Pat. No. 4,812,988).

When the identification circuit 12 has detected the identity of the co-ordinates ($X_C$, $Y_C$) and of the co-ordinates ($X_D$, $Y_D$), the successive slices of the N/P identifier are stored (connection 9) in an identification memory 17 in the course of the predetermined number of frames. When the entirety of the N bits of the identifier is received, the latter is then transmitted to the computer 18, which identifies the encoded surface which relates thereto. The computer 18 transmits to the image memory 15 information permitting the representation on the screen of the visual display device 16, of the images formed from encoded surfaces. The display of an index on the screen or any other means permits the attention of the user to be drawn to the identification obtained.

Figure 1B:
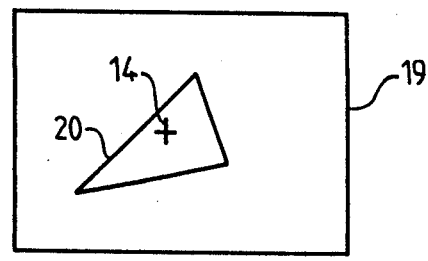
FIG. 1B represents a view of the surface of the visual display screen.

FIG. 1B represents the screen 19 of the visual display device 16, on which an encoded surface 20 and a graphics reference 14 associated with the box 13 are represented.

Figure 2A:
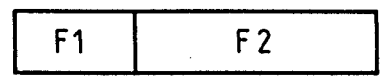
FIG. 2A, 2B represent a representation of the mechanism for encoding the identifier.
Figure 2B:
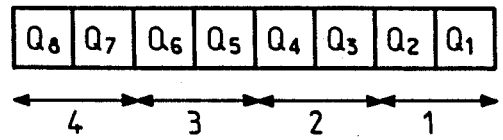

FIG. 2A and 2B represent the mechanism for encoding the identifier. An encoded surface will be characterized by the data field F2 in the form, for example, of vertices or of edges of polygons, for example as described in the document EP 0 215 510(U.S. Pat. No. 4,812,988). According to the invention, there is associated with this field F2 a second field F1 which constitutes an identifier of this encoded surface. Such a field F1 may be constituted from 1 or more bits, for example 8 bits, in accordance with FIG. 2B. This field F1 of N bits will be capable of being detected over a number P of frames. Thus, taking the example with N=8 bits, it is possible to effect 4 loadings into image memory and then to detect over four frames (P=4) four times 2 identifier bits. Depending upon the desired speed for effecting this exchange, it is possible to load/detect the 8 bits, bit after bit, over 8 successive loadings/frames or any other combination.

Figure 3:
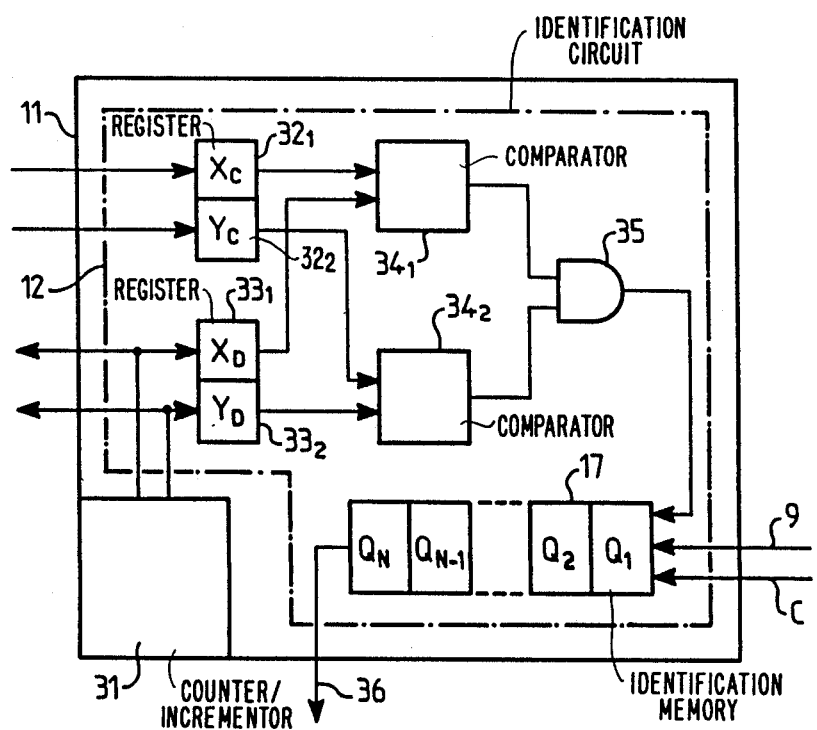
FIG. 3 represents the identification circuit according to the invention.
Figure 4:
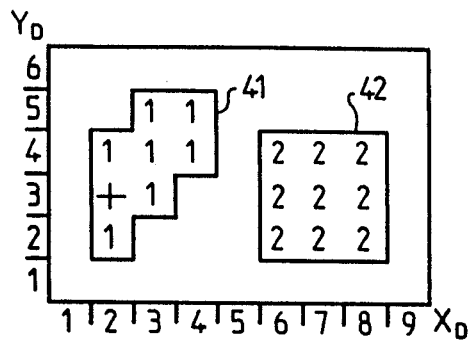
FIG. 4, 5, 6 and 7 represent a representation of the acquisition of an identifier on four successive scanning frames.
Figure 4:
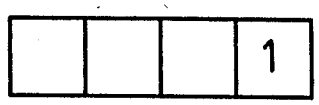
Figure 5:
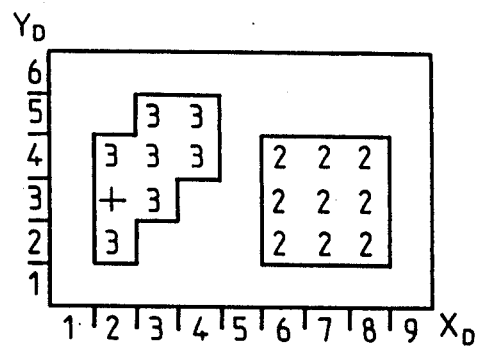
Figure 5:
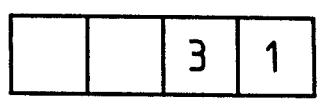
Figure 6:
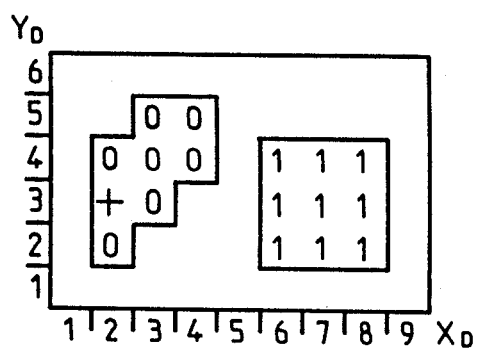
Figure 6:
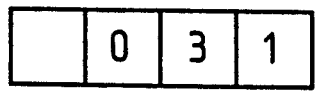
Figure 7:
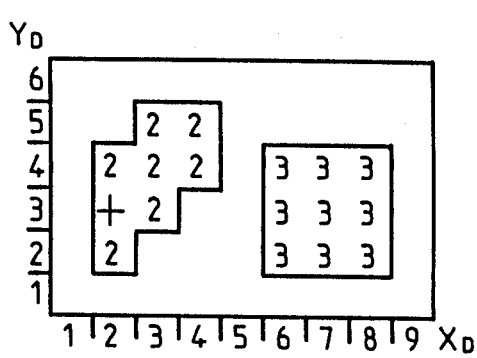
Figure 7:
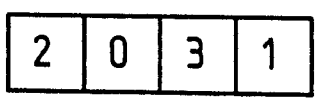

FIG. 3 represents the identification circuit 12 which permits the processing of the identifier. The graphics controller 11 comprises the identification circuit 12 and a counter/incrementor 31. The latter supplies the co-ordinates $X_D$, $Y_D$ of a current point of the screen to which data in the image memory correspond. The circuit 12 also receives the coordinates $X_C$, $Y_C$ input by the box manipulated by the user. These co-ordinates are stored in registers $32_1$, $32_2$, $33_1$, $33_2$. The data $X_C$ and $X_D$ on the one hand and $Y_C$ and $Y_D$ on the other hand are compared respectively in the comparators $34_1$ and $34_2$. When there is identity in twos, the gate 35 delivers a signal which enables the input of the N/P bit slice (connection 9) of the identifier $I_D$ into the identification memory 17. The mechanism is maintained during the desired number P of frames by a control signal C emanating from the computer 18. When the identifier has been received in its entirety, it is transmitted by the connection 36 to the computer 18 (FIG. 1A), which displays a specified index on the screen of the visual display device 16 or warns the user that the encoded surface has been identified.

FIG. 4, 5, 6 and 7 represent the acquisition of an identifier over four successive frames. Let it be assumed that an encoded surface 41 is to be identified and that an encoded surface 42 does not form the subject of an identification. The graphics cursor is, for example, positioned at $X_C=2$ and $Y_C=3$. When the counter/incrementor delivers the co-ordinates $X_D=2$ and $Y_D=3$, there is then identity. Let an identifier encoded over 8 bits be represented in the figures in decimal notation, in order to facilitate the representation. At the first frame (FIG. 4), the identifier memory acquires the term "1" of the identifier. Then, in the course of the 2nd, 3rd, 4th frame (FIGS. 6 and 7), it acquires respectively the terms "3" and then "0" and then "2", in order to have available, at the end of the 4 frame, the complete identifier "2031". The identifier of the other encoded surface 42 has itself also proceeded, but has not given rise to identification.

The identifier "2031" is then transmitted to the computer 18, for example, in order to permit a search, within the image memory 18, for all the data relating to this encoded surface 41, in order to effect the intervention desired by the user.

We claim:

1. A video graphics system equipped with a graphics cursor and with a comparator which compares the positional co-ordinates $X_C$, $Y_C$ of the graphics cursor with the co-ordinates $X_D$, $Y_D$ of each image element of each line, the elements being explored in accordance with a scanning by frames, the graphics cursor interacting with the image delivered by the video graphics system, characterized in that said video graphics system comprises:
an image memory which, in the course of successive loadings, temporarily stores:
(a) numerical parameters describing encoded surfaces relating to two-dimensional images,
(b) and an N bit identifier, specific to an encoded surface in such a manner that the N bits are successively loaded into said image memory by slices of N/P bits in the course of P successive loadings, where N and P are integers and P is greater than 1, each loading being followed by a reading of the image memory in order to display the image visually in accordance with the successive frames of the scanning by frames, p1 and a graphics controller which receives the slices of N/P bits at each read frame and reconstructs the N bit identifier of said encoded surface after P successive frames, said graphics controller comprising an identification circuit comprising the comparator and an identification memory which accumulates and stores the slices of N/P bits once the comparator has detected the identity of the co-ordinates $X_C$, $Y_C$ and co-ordinates $X_D$, $Y_D$, the complete identifier stored, in said identification memory being used by the video graphics controller to identify said encoded surface.

2. A video graphics system according to claim 1, wherein the image memory and the identification memory store the N bits of the identifier while operating, bit after bit, in the course of N loadings and of N scanning frames respectively.

3. A video Video graphics system according to claim 1 wherein the identification memory is a shift register.

4. A video graphics system according to claim 2, characterized in that wherein the identification memory is a shift register.

* * * * *